United States Patent
Saruwatari et al.

(10) Patent No.: US 6,845,741 B2
(45) Date of Patent: Jan. 25, 2005

(54) PISTON FOR AN INTERNAL COMBUSTION ENGINE

(75) Inventors: Masayuki Saruwatari, Gunma (JP); Yoshitatsu Nakamura, Gunma (JP)

(73) Assignee: Hitachi Unisia Automotive, Ltd., Kanagawa (JP)

( * ) Notice: Subject to any disclaimer, the term of this patent is extended or adjusted under 35 U.S.C. 154(b) by 0 days.

(21) Appl. No.: 10/442,928

(22) Filed: May 22, 2003

(65) Prior Publication Data

US 2004/0003793 A1 Jan. 8, 2004

(30) Foreign Application Priority Data

May 24, 2002 (JP) ......................................... 2002-150886

(51) Int. Cl.[7] ................................................. F02F 3/24
(52) U.S. Cl. .................................................... 123/193.6
(58) Field of Search ............................. 123/193.6, 659; 92/172–261

(56) References Cited

U.S. PATENT DOCUMENTS

| | | | | |
|---|---|---|---|---|
| 6,220,215 B1 | * | 4/2001 | Morimoto | 123/193.6 |
| 6,578,547 B2 | * | 6/2003 | Piock | 123/305 |
| 6,615,789 B2 | * | 9/2003 | Inoue et al. | 123/193.6 |

FOREIGN PATENT DOCUMENTS

JP         2000-18041 A      1/2000

* cited by examiner

*Primary Examiner*—Marguerite McMahon
(74) *Attorney, Agent, or Firm*—Sughrue Mion, PLLC

(57) ABSTRACT

A piston for an internal combustion engine is provided. The engine has an intake port through which an intake air is introduced into the cylinder in a way as to produce a swirl that travels along while whirling about an axis transversal to an axis of the cylinder. The piston has at a crown face thereof a cavity that has a part-cylindrical bottom. The cavity has a longitudinal center axis extending obliquely to a crank axis so that the longitudinal center axis of the cavity nearly coincides with an axis along which the swirl travels within the cylinder.

7 Claims, 4 Drawing Sheets

PISTON FOR AN INTERNAL COMBUSTION ENGINE

BACKGROUND OF THE INVENTION

The present invention relates to a piston for an internal combustion engine, particularly of the kind having a cavity at a crown face thereof.

A piston of the above-described kind is disclosed in Japanese Patent Provisional Publication No. 2000-018041.

The piston disclosed in the Publication has at a crown face thereof indentations or valve pockets that are opposed to intake and exhaust valves, respectively and a cavity that is provided continuously from the valve pockets so as to constitute a combustion chamber, which cavity has a longitudinal axis in parallel with a crank axis.

SUMMARY OF THE INVENTION

In an engine of the kind adapted to burn a mixture of a lean air-fuel ratio, it has been practiced to provide an intake port with an intake control valve (swirl control valve) and close the intake control valve at low-load of the engine thereby producing a swirl, i.e., a flow of air-fuel mixture that travels along while whirling about a horizontal axis or an axis transversal to an axial direction of the piston within the cylinder.

However, the piston of the above-described kind encounters a problem that the cavity constitutes an obstacle to the swirl and decreases the intensity of the swirl since the traveling direction of the swirl and the longitudinal center axis of the cavity do not coincide with each other.

It is accordingly an object of the present invention to provide a piston that is free from the above-described problem, i.e., that can prevent the swirl introduced into the cylinder from being obstructed by the cavity that is formed in the crown face so as to constitute a combustion chamber, thereby improving the combustion efficiency of the engine.

To achieve the above object, there is provided according to an aspect of the present invention a piston for an internal combustion engine comprising a crown having a cavity at a crown face thereof, wherein the cavity has a longitudinal center axis that extends obliquely to a crank axis of the internal combustion engine.

According to another aspect of the present invention, there is provided an internal combustion engine comprising a cylinder, an intake port through which an intake air is introduced into the cylinder in a way as to produce a swirl that travels along while whirling about an axis transversal to an axis of the cylinder, and a piston having at a crown face thereof a cavity that has a part-cylindrical bottom, the cavity having a longitudinal center axis extending obliquely to a crank axis so that the longitudinal center axis of the cavity nearly coincides with the axis along which the swirl travels within the cylinder.

BRIEF DESCRIPTION OF THE DRAWINGS

FIGS. 2A to 2C are views for showing a crown face of the piston of FIG. 1, wherein FIG. 2A is a top plan view of the piston, and FIGS. 2B and 2C are sectional views taken along the lines 2B–2B and 2C–2C in FIG. 2A, respectively;

DESCRIPTION OF THE PREFERRED EMBODIMENT

Figure 1:
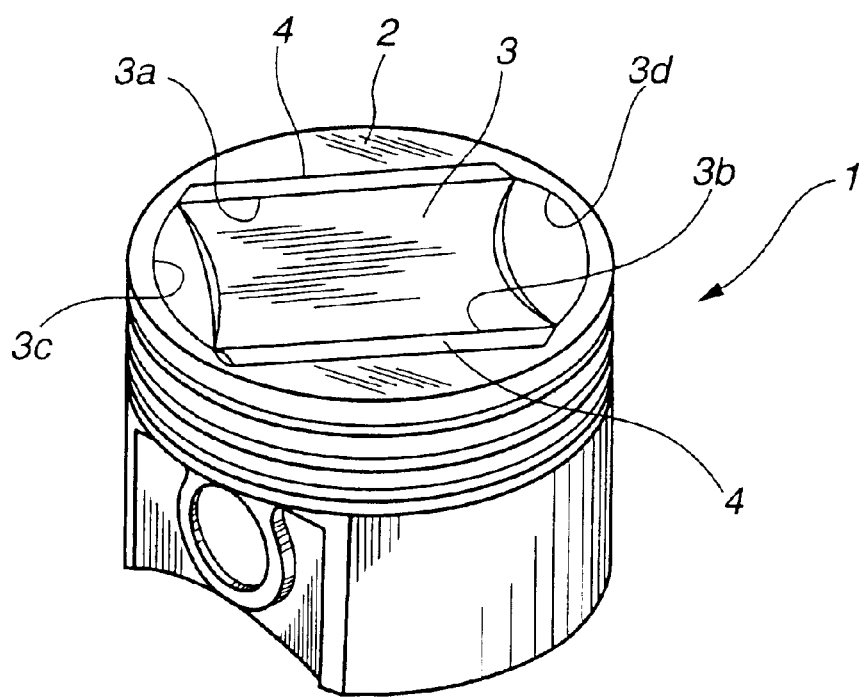
FIG. 1 is a perspective view of a piston according to an embodiment of the present invention.
Figure 2:
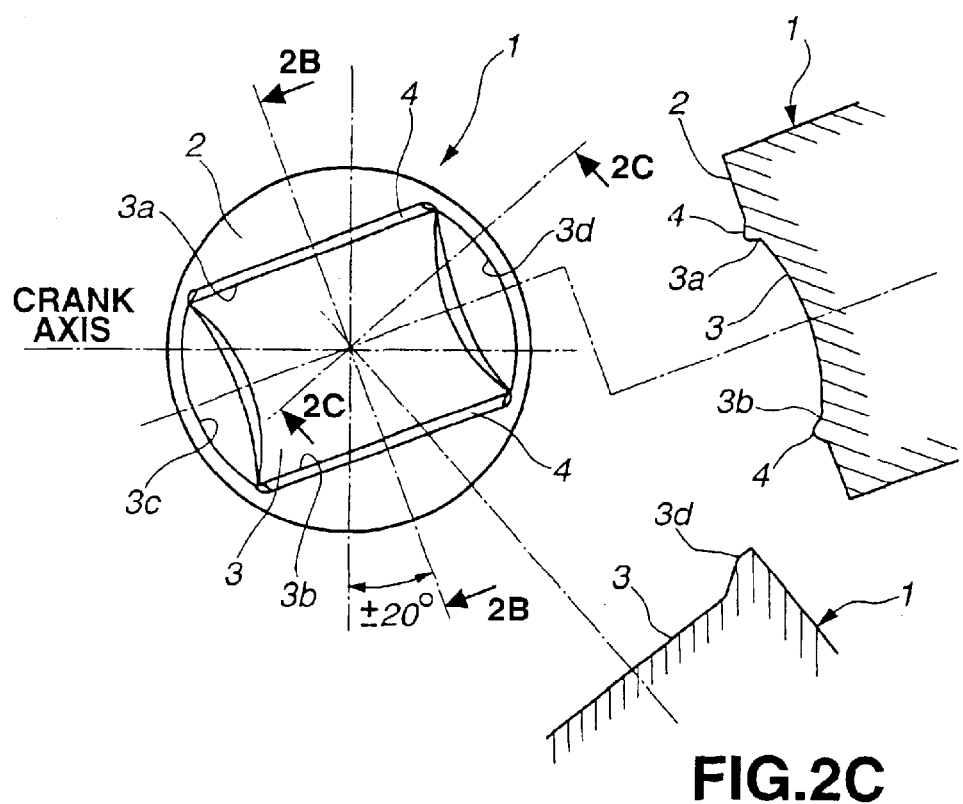

Referring first to FIGS. 1 and 2, a piston that reciprocates within a cylinder of an internal combustion engine is generally indicated by 1. The piston 1 has a crown 2 that is formed with a cavity 3 at a top face or crown face thereof.

The cavity 3 has at the crown face of the crown 2 an open end consisting of parallel, straight longitudinal side edges 3a, 3b and part-circular edges 3c, 3d connecting between the opposite ends of the side edges 3a, 3b, respectively. The side edges 3a, 3b are parallel to a center axis that forms 20° with a crank axis and diametrically opposed in a way as to be nearly equidistant from the center of the crown face of the crown 2 (i.e., the center axis of the piston 1) and have terminal ends located adjacent the circumferential periphery of the piston 1.

Namely, the cavity 3 is formed so as to have a longitudinal direction or longitudinal center axis that forms 20° with a crank axis or an axis of a piston pin (not shown).

Further, the bottom of the cavity 3, when cut by a plane perpendicular to the longitudinal center axis of the cavity 3, has a part-circular sectional shape that is smoothly continuous from the open end. In other words, the cavity 3 has a generally part-cylindrical bottom. The piston 1 has at the crown face of the crown 2 two small projections 4 that extend along the respective side edges 3a, 3b and that are rounded so as to be smoothly continuous with the part-cylindrical bottom of the cavity 3.

Further, the bottom of the cavity 3 has opposite longitudinal end portions that ascend smoothly toward the respective part-circular edges 3c, 3d.

Figure 3:
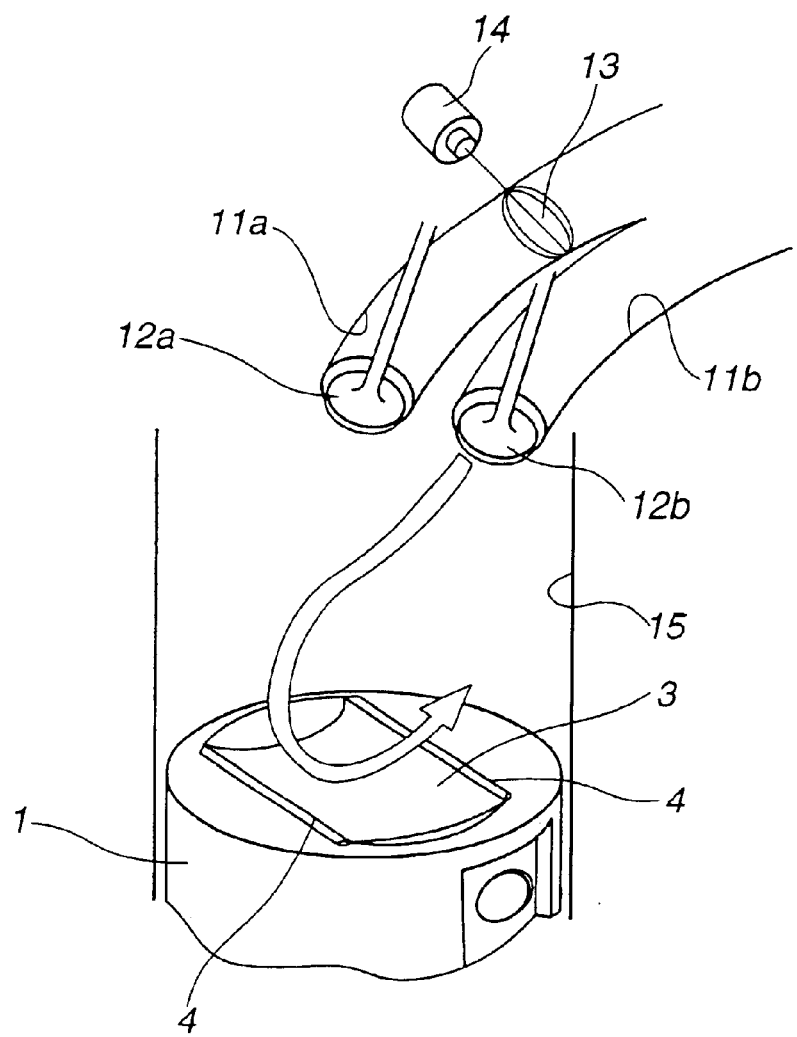
FIG. 3 is a schematic, perspective view of a cylinder of an internal combustion engine for illustrating a swirl producing mechanism and a swirl produced thereby.
Figure 4:
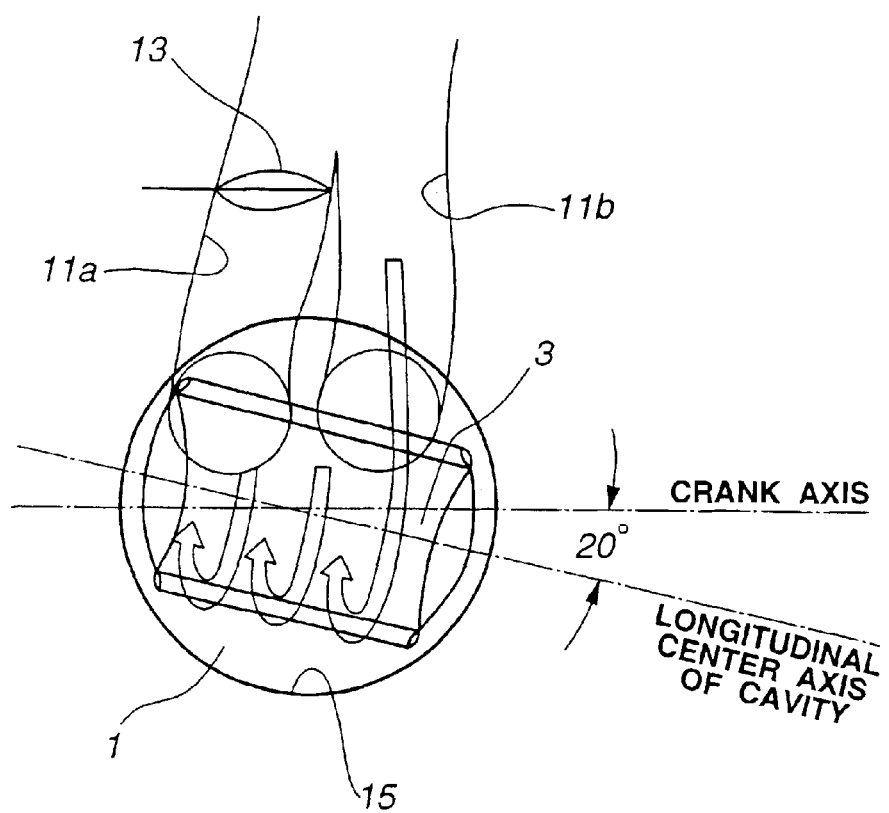
FIG. 4 is a schematic, top plan view of the cylinder for illustrating the swirl producing mechanism and the swirl.

FIGS. 3 and 4 show the piston 1 in a state of being installed in an internal combustion engine having a swirl control valve 13 at an intake port 11a.

The engine shown in FIGS. 3 and 4 have at each cylinder two intake ports 11a, 11b that are opened and closed by intake valves 12a, 12b, respectively.

One of the intake ports 11a, 11b, i.e., the intake port 11a is provided with the swirl control valve 13.

The swirl control valve 13 is a butterfly valve and is made up of a rotatable shaft (no numeral) that is driven by an actuator 14 and a valve body (no numeral) fixed to the rotatable shaft. The swirl control valve 13 is closed, for example, at a low-load operating condition of the engine.

When the swirl control valve 13 is closed, the intake port 11a is shut off so that the intake air is introduced into the cylinder 13 only from the intake port 11b. Thus, there is generated within the cylinder 15 a swirl, i.e., a flow of air-fuel mixture that travels along while whirling about an axis transversal to the axis of the piston 1. In other words, there is generated within the cylinder 15 a flow of air-fuel mixture that travels substantially in a helical path that extends in the direction transversal to the axial direction of the cylinder 15.

In the engine, the piston 1 is disposed so as to allow the longitudinal center axis of the cavity 3 to be more distant from the intake port 11a than from the intake port 11b.

By so disposing the piston 1 with respect to the intake ports, it becomes possible to nearly coincide the direction in which the swirl travels within the cylinder 15 and the longitudinal center axis of the cavity 3 with each other such that the swirl is not interfered or obstructed by the cavity 3.

Accordingly, it becomes possible to generate a strong swirl within the cylinder 15 and improve the combustion efficiency.

Particularly, by constructing, as in this embodiment, so that the bottom of the cavity 3 has a part-circular sectional shape when cut by a plane perpendicular to the longitudinal direction of the cavity 3, the swirl can travel smoothly along the part-cylindrical bottom, thus not causing any obstacle to the swirl.

Further, by the effect of the small projections 4 provided to the opposite side edges 3a, 3b extending in the longitudinal direction of the cavity 3, the turbulence that is caused when the swirl flows out of the cavity 3 can be small and the swirl can be introduced smoothly into the cavity 3, thus making it possible to maintain the strong swirl efficiently.

The entire contents of Japanese Patent Applications P2002-150886 (filed May 24, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while in the embodiment described above the angle between the longitudinal direction of the cavity 3 and the crank axis is determined as 20°, this is not for the purpose of limitation. However, the angle between the longitudinal direction of the cavity 3 and the crank axis is preferably set at a value within the range from 15° to 25° and more preferably at 20° as in the embodiment. Further, the inclination of the longitudinal direction of the cavity 3 with respect to two intake ports is not limited to that in the embodiment described above. For example, the longitudinal center axis of the cavity 3 can be inclined so as to be more distant from one of the intake ports that is closed when a swirl is to be generated, that is, the inclination of the longitudinal center axis of the cavity 3 with respect to two intake ports should be determined based on the swirl generating characteristics of the engine in which the piston 1 is installed. Further, the structure for generating a swirl is not limited to the system in which one of two intake ports is closed but can be, for example, such one in which the intake port is partially opened so as to deflect the flow of intake air and thereby generate a swirl. Further, the cavity 3 described above can be provided with indentations or valve pockets for receiving intake and/or exhaust valves. The scope of the invention is defined with reference to the following claims.

What is claimed is:

1. A piston for an internal combustion engine comprising a crown having a cavity at a crown face thereof, wherein the cavity has a longitudinal center axis that extends obliquely to a crank axis of the internal combustion engine.

2. A piston according to claim 1, wherein the cavity has a generally part-circular sectional shape when cut by a plane perpendicular to the longitudinal center axis of the cavity.

3. A piston according to claim 1, wherein the cavity has a pair of longitudinal side edges that are diametrically opposed to each other, the crown further having at the crown face thereof small projections that extend along the longitudinal side edges, respectively.

4. A piston according to claim 1, wherein the angle between the longitudinal center axis of the cavity and the crank axis is within the range from 15° to 25°.

5. An internal combustion engine comprising:
   a cylinder;
   an intake port through which an intake air is introduced into the cylinder in a way as to produce a swirl that travels along while whirling about an axis transverse to an axis of the cylinder; and
   a piston having at a crown face thereof a cavity that has a part-cylindrical bottom, the cavity having a longitudinal center axis extending obliquely to a crank axis so that the longitudinal center axis of the cavity nearly coincides with the axis along which the swirl travels within the cylinder.

6. A piston according to claim 5, wherein the cavity has a pair of longitudinal side edges that are diametrically opposed to each other, the crown further having at the crown face thereof small projections that extend along the longitudinal side edges, respectively.

7. A piston according to claim 5, wherein the angle between the longitudinal center axis of the cavity and the crank axis is within the range from 15° to 25°.

* * * * *